(12) United States Patent
Koli et al.

(10) Patent No.: US 10,458,210 B2
(45) Date of Patent: Oct. 29, 2019

(54) MANUFACTURING METHOD OF RIB SUPPORT FOR SCREEN/FILTER CARTRIDGE

(71) Applicants: Jai Kishan Koli, Houston, TX (US); Aaron C. Hammer, Houston, TX (US)

(72) Inventors: Jai Kishan Koli, Houston, TX (US); Aaron C. Hammer, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 378 days.

(21) Appl. No.: 15/192,508

(22) Filed: Jun. 24, 2016

(65) Prior Publication Data

US 2017/0370192 A1    Dec. 28, 2017

(51) Int. Cl.
  *E21B 43/08*    (2006.01)
  *B23K 11/00*    (2006.01)

(52) U.S. Cl.
  CPC .......... *E21B 43/086* (2013.01); *B23K 11/002* (2013.01)

(58) Field of Classification Search
  CPC .... E21B 43/088; E21B 43/084; E21B 43/086; E21B 43/082; E21B 43/08; B01D 29/111
  See application file for complete search history.

(56) References Cited

U.S. PATENT DOCUMENTS

| | | | | |
|---|---|---|---|---|
| 5,394,938 A | * | 3/1995 | Cornette | E21B 17/22 166/205 |
| 5,460,721 A | * | 10/1995 | Goodwin | B01D 29/111 156/190 |
| 5,881,812 A | * | 3/1999 | Malbrel | B01D 29/111 166/278 |
| 5,979,551 A | * | 11/1999 | Uban | E21B 43/088 166/231 |
| 6,305,468 B1 | | 10/2001 | Broome et al. | |
| 2008/0217002 A1 | * | 9/2008 | Simonds | E21B 43/084 166/230 |
| 2010/0122810 A1 | * | 5/2010 | Langlais | E21B 43/088 166/230 |
| 2011/0180257 A1 | * | 7/2011 | Scott | E21B 43/084 166/276 |
| 2011/0180258 A1 | * | 7/2011 | Scott | E21B 43/08 166/278 |
| 2012/0048536 A1 | * | 3/2012 | Holderman | B23P 11/025 166/228 |
| 2012/0152528 A1 | * | 6/2012 | Greci | E21B 43/088 166/227 |
| 2017/0074077 A1 | * | 3/2017 | Bowen | E21B 43/08 |

OTHER PUBLICATIONS

"SinterPore®: Sand Screen Filtration Products", Porous Metal Filters Inc., 4 pages.

* cited by examiner

*Primary Examiner* — Kipp C Wallace
(74) *Attorney, Agent, or Firm* — Cantor Colburn LLP

(57) ABSTRACT

A method of forming a screen assembly includes arranging a first end portion of each of a plurality of rib members into a rib alignment jig, positioning a sleeve about the rib alignment jig with an inner surface of the sleeve abutting the first end portion of each of the plurality of rib members, and resistance welding the sleeve to the first end portion of each of the plurality of rib members.

10 Claims, 10 Drawing Sheets

MANUFACTURING METHOD OF RIB SUPPORT FOR SCREEN/FILTER CARTRIDGE

BACKGROUND

During various downhole operations there may be a need to control sand and/or other debris entrained in to downhole fluids. Sand screens may be provided about a tubular having inlet openings that receive downhole fluids. The sand screens may include one or more layers each having gradually decreasing opening sizes with an outer most screen layer including openings that are larger than an innermost screen layer. Currently, sand screens may be formed by diffusion bonding screen sheets to one another to form multiple screen layers. Additionally, ribs may be diffusion bonded to the inner most one of the multiple screen layers. Once bonded, the multiple screen layers are rolled into a tube, edge joined, and then mounted to a tubular.

SUMMARY

A method of forming a screen assembly includes arranging a first end portion of each of a plurality of rib members into a rib alignment jig, positioning a sleeve about the rib alignment jig with an inner surface of the sleeve abutting the first end portion of each of the plurality of rib members, and resistance welding the sleeve to the first end portion of each of the plurality of rib members.

A screen assembly includes a first sleeve including an inner surface and an outer surface, a second sleeve including an inner surface and an outer surface, and a plurality of ribs extending between the first and second sleeves. Each of the plurality of ribs is joined to one of the inner and outer surfaces of the first sleeve and one of the inner and outer surfaces of the second sleeve. A screen cartridge extends between and coupled to the first and second sleeves. The screen cartridge is decoupled from the plurality of ribs.

BRIEF DESCRIPTION OF THE DRAWINGS

Referring now to the drawings wherein like elements are numbered alike in the several Figures.

DETAILED DESCRIPTION

Figure 1:
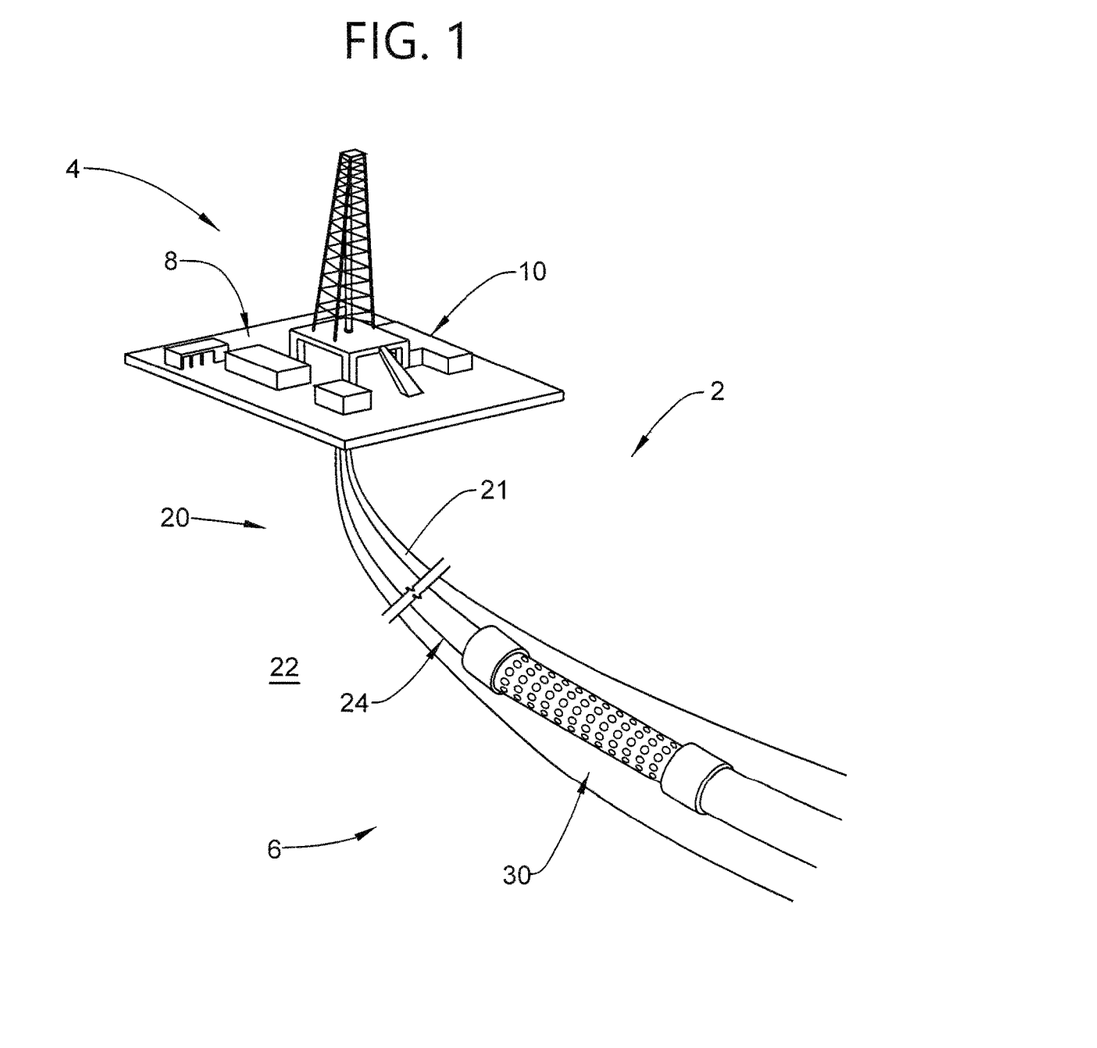
FIG. 1 depicts a resource exploration system including a screen assembly, in accordance with an aspect of an exemplary embodiment.

A resource exploration system, in accordance with an exemplary embodiment, is indicated generally at 2, in FIG. 1. Resource exploration system 2 should be understood to include well drilling operations, resource extraction and recovery, $CO_2$ sequestration, and the like. Resource exploration system 2 may include a surface system 4 operatively connected to a downhole system 6. Surface system 4 may include pumps 8 that aid in completion and/or extraction processes as well as fluid storage 10. Fluid storage 10 may contain a gravel pack fluid or slurry (not shown) that is introduced into downhole system 6.

Downhole system 6 may include a downhole string 20 that is extended into a wellbore 21 formed in formation 22. Downhole string 20 may include a number of connected downhole tools or tubulars 24. One of tubulars 24 may be connected with a screen assembly 30. Screen assembly 30 filters out or blocks various particles from entering downhole string 20 during select downhole operations.

Figure 2:
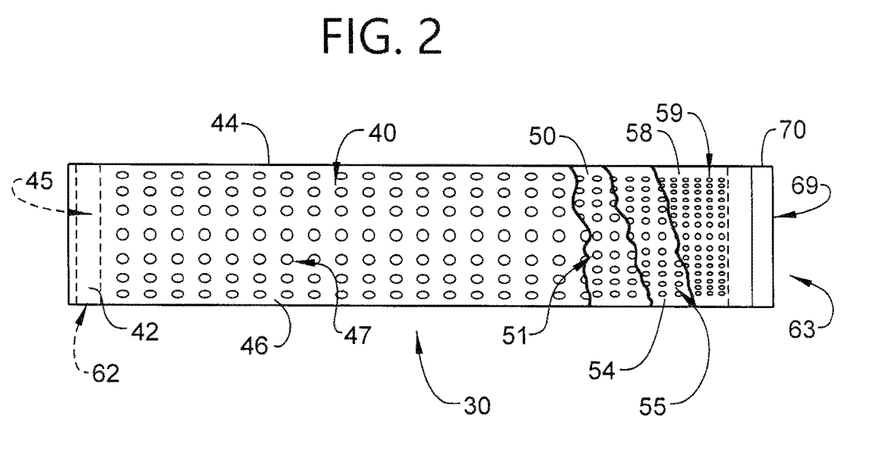
FIG. 2 depicts a plan view of the screen assembly of FIG. 1.

In accordance with an aspect of an exemplary embodiment depicted in FIG. 2, screen assembly 30 includes a screen cartridge 40 having a first end 42, a second end 43, and an intermediate portion 44 defining a flow passage 45 extending therebetween. Screen cartridge 40 is formed from multiple diffusion bonded screen layers. More specifically, screen cartridge 40 may include a first screen layer 46 which may take the form of a perforated tube having a first plurality of openings 47, a second screen layer 50 having a second plurality of openings 51 smaller than the first plurality of openings 47, a third screen layer 54 including a third plurality of openings 55 smaller than the second plurality of openings 51 and a fourth screen layer 58 including a fourth plurality of openings 59 smaller than the third plurality of openings 55. It is to be understood that the number of layers may vary and could be as few as a single layer. It is also to be understood that first, second, third and fourth screen layers 46, 50, 54, and 58 may be diffusion bonded and rolled into a tubular shape. It is to be further understood, that for sake of simplicity of the drawings, second, third and fourth screen layers 50, 54, and 58 are not shown in subsequent figures.

Figure 3:
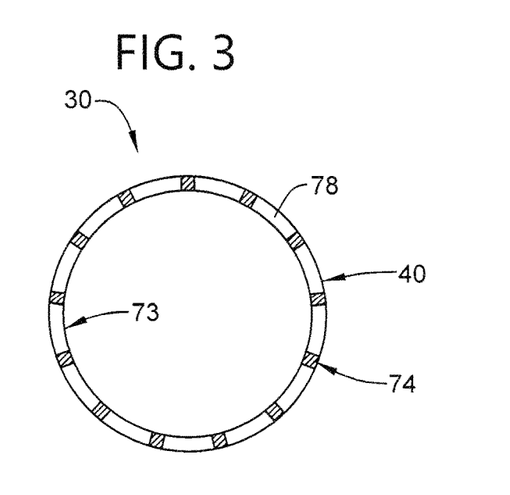
FIG. 3 depicts an axial end view of the screen assembly of FIG. 2.
Figure 4:
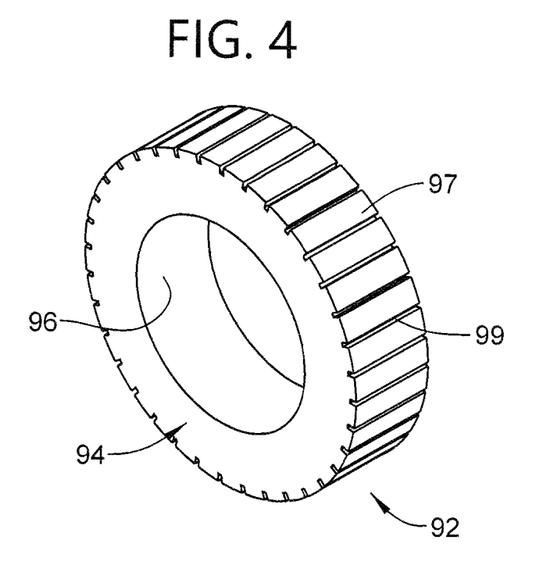
FIG. 4 depicts a rib alignment jig, in accordance with an aspect of an exemplary embodiment.
Figure 6:
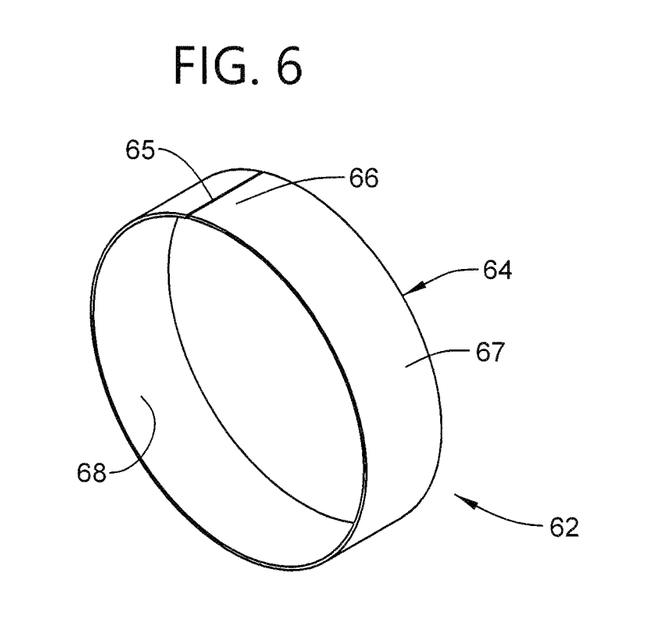
FIG. 6 depicts a first end of a plurality of rib members arranged in the rib alignment jig, in accordance with an aspect of an exemplary embodiment.
Figure 11:
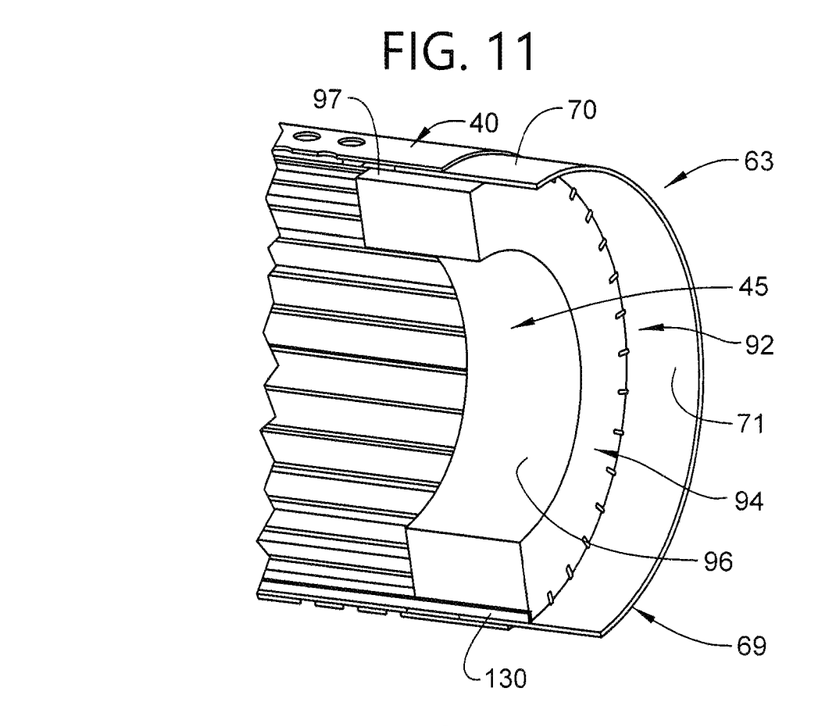
FIG. 11 depicts a second end of the plurality of rib members positioned in a rib alignment jig and another sleeve positioned over the second end of the plurality of rib members, in accordance with an aspect of an exemplary embodiment.

A first sleeve 62 is arranged at first end 42 and a second sleeve 63 is arranged at second end 43. First sleeve 62 takes the form of a sheet metal ring 64 having a first end section 65 and a second end section 66 (FIG. 6). First sleeve 62 also includes an outer surface 67 and an inner surface 68. Second sleeve 63 also may take the form of a sheet metal ring 69 having first and second end sections (not separately labeled), an outer surface 70 and an inner surface 71 (FIG. 11). A tubular 73 having a plurality of openings formed therein (not shown) may extend through flow passage 45 as shown in FIG. 3. Screen assembly 30 also includes a plurality of rib members, one of which is indicated at 74, that extend between first end 42 and second end 43. Plurality of rib members 74 define a plurality of axial flow passages 78 that extend substantially parallel to flow passage 45. Axial flow passages 78 allow fluid passing through screen cartridge 40 to enter into tubular 73.

Figure 5:
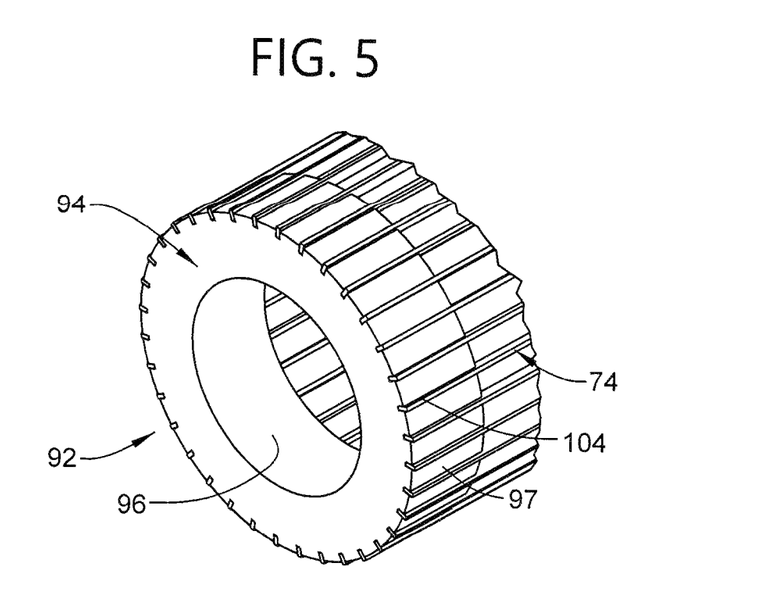
FIG. 5 depicts a sleeve, in accordance with an aspect of an exemplary embodiment.

Reference will now follow to FIGS. 4-12 in describing a method of constructing screen assembly 30 in accordance with an exemplary embodiment. A rib alignment jig 92, depicted in FIG. 4, establishes a desired spacing between adjacent ones of the plurality of rib members 74. Rib alignment jig 92 includes a body 94 having an inner surface 96 and an outer surface 97. A plurality of slots, one of which is indicated at 99, is formed in outer surface 97. Each of the plurality of slots 99 extends a desired depth into body 94. As seen in FIG. 5, a first end portion 104 of each of the plurality of rib members 74 is inserted into a corresponding one of the plurality of slots 99.

Figure 7:
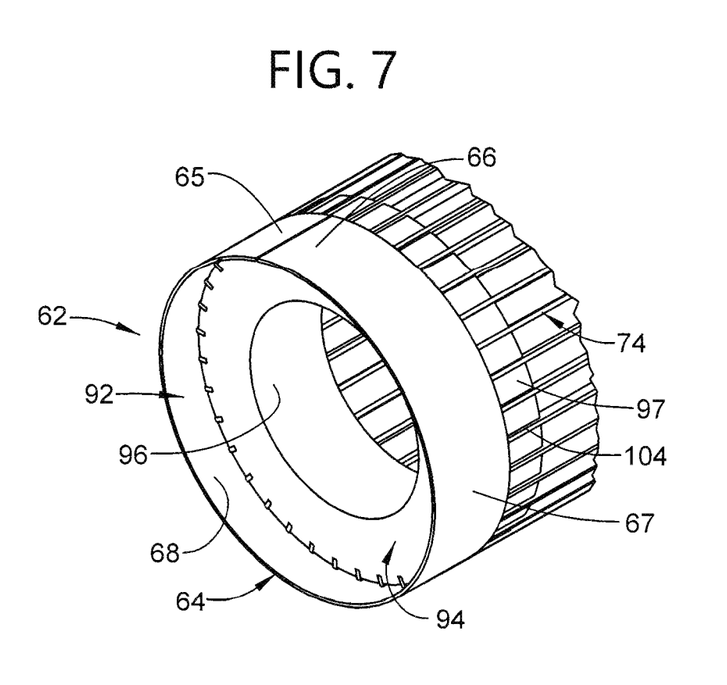
FIG. 7 depicts the sleeve of FIG. 5 positioned over the alignment jig of FIG. 6.
Figure 8:
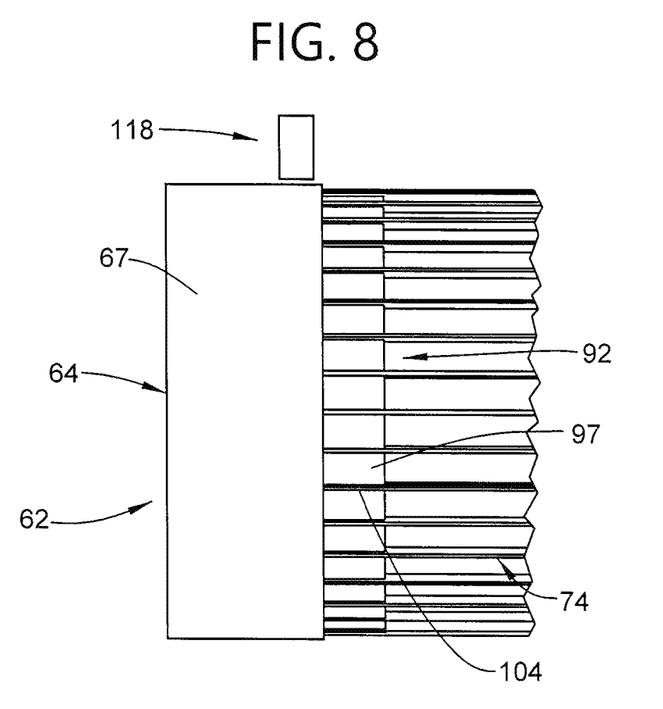
FIG. 8 depicts the first end of each of the plurality of rib members being resistance welded to the sleeve of FIG. 7.
Figure 9:
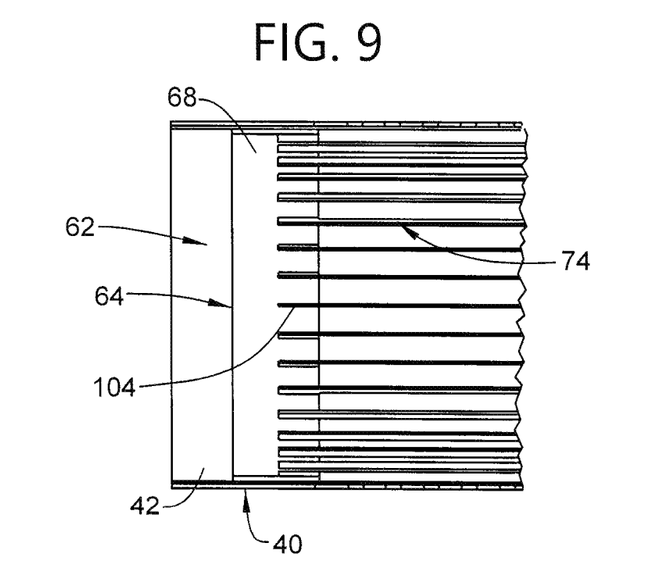
FIG. 9 depicts a screen cartridge over the sleeve and the plurality of ribs.
Figure 10:
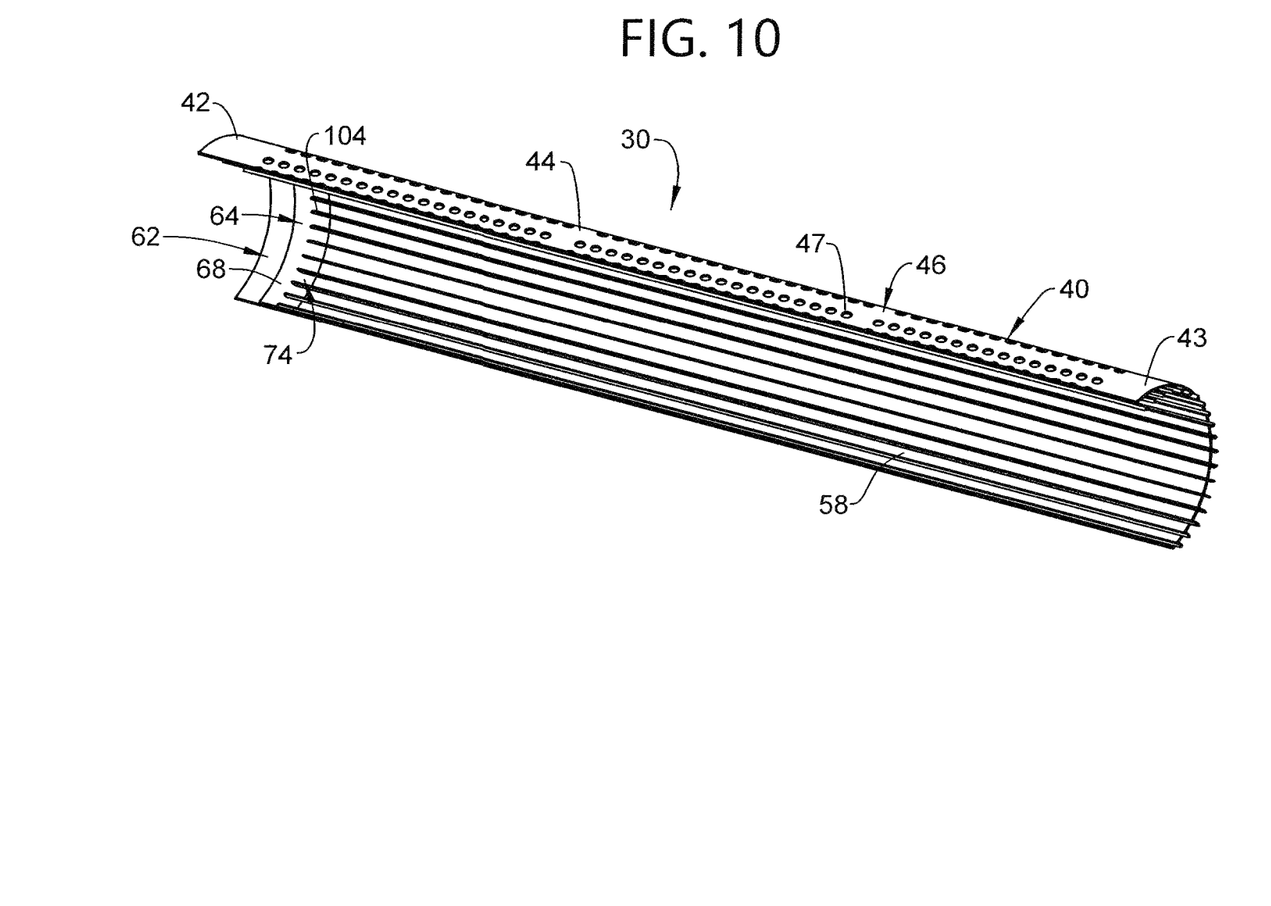
FIG. 10 depicts a partial cross-sectional view of the sleeve cartridge of FIG. 9.

FIG. 6 depicts first sleeve 62 shaped into sheet metal ring 64 prior to installation to the plurality of rib members 74. FIG. 7 depicts first sleeve 62 being installed over rib alignment jig 92 and the plurality of rib members 74. Each of the plurality of rib member 74 is chemically bonded to first sleeve 62. More specifically, a resistance welding apparatus 118 is employed to establish a resistance welded or chemical bond between each of the plurality of rib members 74 and first sleeve 62 as shown in FIG. 8. At this point, rib alignment jig 92 may be removed and screen cartridge 40 installed over first sleeve 62 and the plurality of rib members 74 as shown in FIGS. 9 and 10. Screen cartridge 40 may then be bonded to first sleeve 62 through a resistance weld bond.

Figure 12:
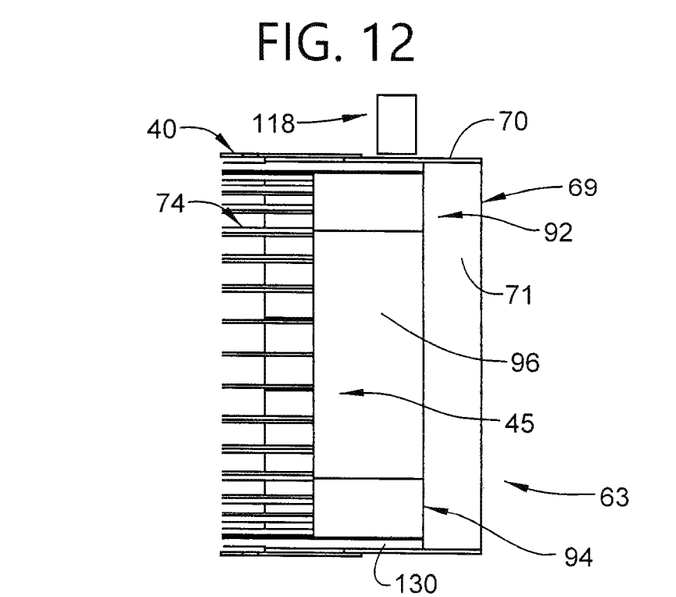
FIG. 12 depicts the another sleeve being resistance welded to the second end of the plurality of rib members, in accordance with an aspect of an exemplary embodiment.

FIG. 11 depicts rib alignment jig 92 being coupled to a second end portion 130 of each of the plurality of rib members 74 as shown in FIG. 11. It is to be understood that the rib alignment jig 92 employed at second end portion 130 of the plurality of rib members 74 may be the same as employed at first end portion 104 or could be an additional rib alignment jig. FIG. 11 also depicts second sleeve 63 being installed over second end portion 130 of the plurality of rib members 74 and under screen cartridge 40. More specifically, first and second sleeves 62 and 63 may be positioned radially inwardly of screen cartridge 40. It is to be understood, that first and second sleeves 62 and 63 may be arranged radially outwardly of screen cartridge 40. The second end portion 130 of each of the plurality of ribs 74 is chemically bonded to second sleeve 63. In a manner similar to that described above, resistance welding apparatus 118 is employed to create a resistance welded or chemical bond between second sleeve 63 and second end portion 130 of each of the plurality of rib members 74 as shown in FIG. 12. Resistance welding apparatus 118 may also be employed to create a resistance welded bond between screen cartridge 40 and second sleeve 63.

Figure 13:
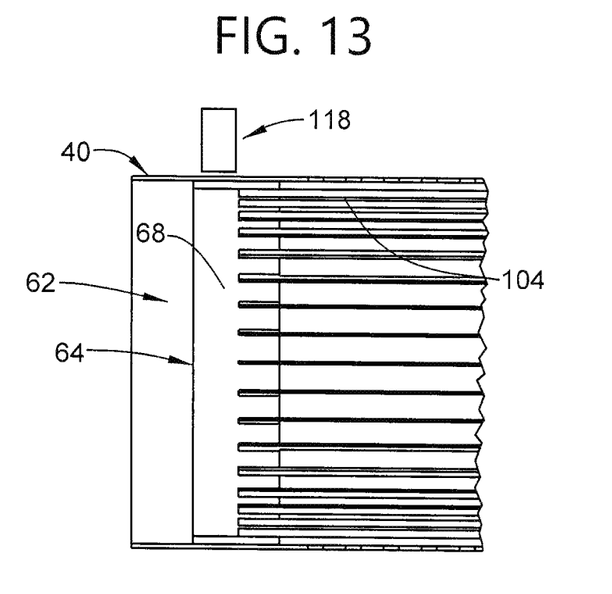
FIG. 13 depicts the screen cartridge being joined to the sleeve of FIG. 9.
Figure 14:
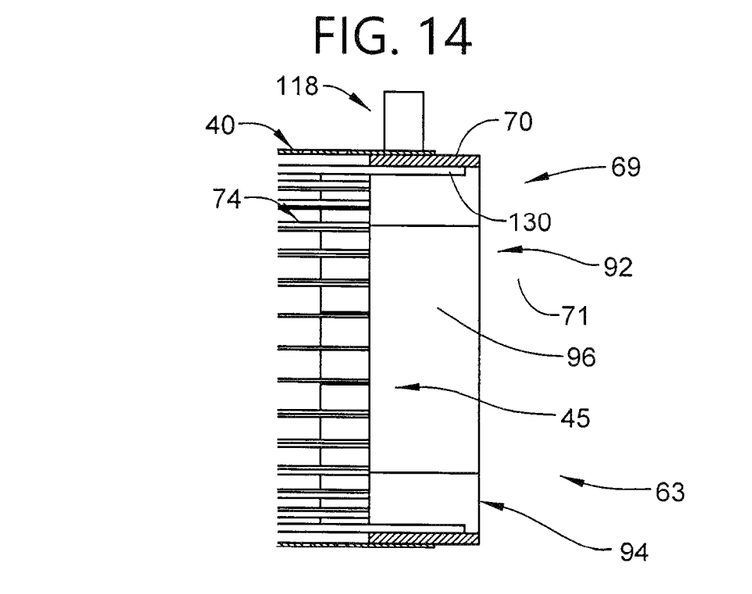
FIG. 14 depicts the screen cartridge being joined to the sleeve of FIG. 12.
Figure 15:
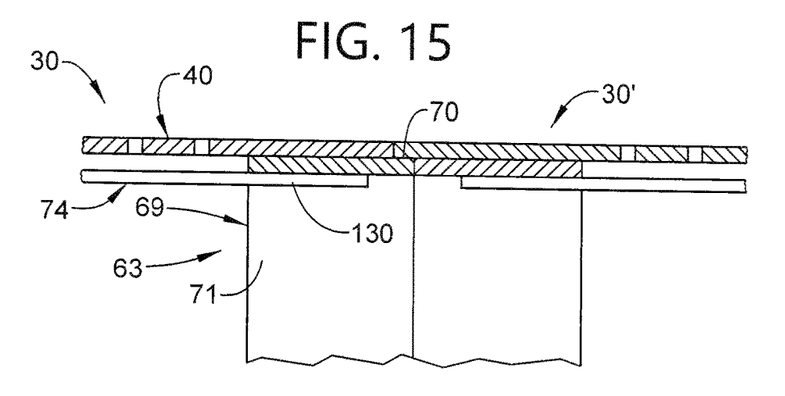
FIG. 15 depicts a first screen assembly being joined to a second screen assembly, in accordance with an exemplary embodiment.
Figure 16:
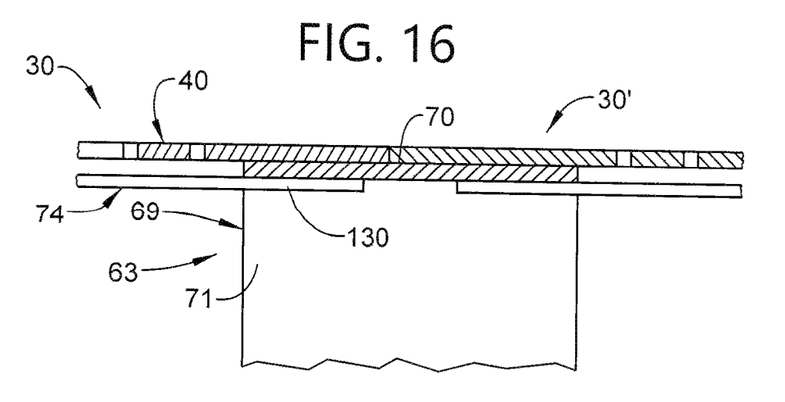
FIG. 16 depicts a first screen assembly being joined to a second screen assembly through a single sleeve, in accordance with an exemplary embodiment

FIG. 13 depicts screen cartridge 40 being resistance welded to first sleeve 62. FIG. 14 depicts screen cartridge 40 being resistance welded to second sleeve 62. As clearly shown in FIGS. 13 and 14, screen cartridge 40 is decoupled from the plurality of ribs 74. The term "decoupled" should be understood to describe that screen cartridge 40 is not connected to any one of the plurality of ribs 74. FIG. 15 depicts screen assembly 30 joined to another screen assembly 30'. In accordance with an aspect of an exemplary embodiment, screen assembly 30 may be joined to screen assembly 30' through resistance welding techniques. FIG. 16 depicts screen assembly 30 joined to another screen assembly 30' through a single sleeve 63, in accordance with another exemplary aspect.

Figure 17:
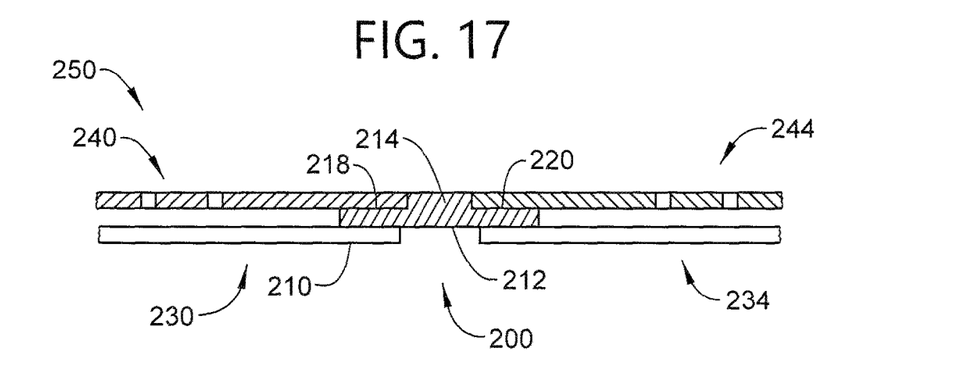
FIG. 17 depicts a sleeve, in accordance with another aspect of an exemplary embodiment.

Reference will now follow to FIG. 17 in describing a sleeve 200 in accordance with another aspect of an exemplary embodiment. Sleeve 200 includes a body 210 having an inner annular surface 212, a raised portion 214, a first recessed section 218 and a second recessed section 220. A first plurality of ribs 230 and a second plurality of ribs 234 may be positioned on inner annular surface 212. A first screen cartridge 240 may be coupled to sleeve 200 in first recessed section 218 and a second screen cartridge 244 may be coupled to sleeve 200 in second recessed section 244 to form a screen assembly 250.

Figure 18:
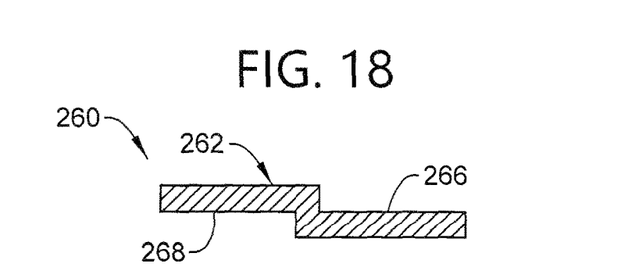
FIG. 18 depicts a sleeve, in accordance with yet another aspect of an exemplary embodiment.

FIG. 18 depicts a sleeve 260 having a body 262 including a first recessed section 266 arranged on a first side of body 262 and a second recessed section 268 arranged on an opposing side of body 262. Sleeve 200 may be joined to a similar sleeve (not shown) to join two screen assemblies. It is to be understood, that the geometry of the sleeves in accordance with exemplary embodiments may vary. Further, while described as being formed from sheet metal, it is to be understood that the sleeves may be formed from a wide selection of materials.

It is to be understood that screen assembly 30 may take on a number of configurations. For example, the number of screen layers may vary. Openings in each screen layer may increase in size from a radial innermost layer, to a radial outermost layer. Screen openings may also decrease in size from a radially innermost layer to a radial outermost layer. It is also to be understood that multiple downhole screen assemblies may be joined and fitted about a downhole tubular.

Embodiment 1. A method of forming a screen assembly comprising: arranging a first end portion of each of a plurality of rib members into a rib alignment jig; positioning a sleeve about the rib alignment jig with an inner surface of the sleeve abutting the first end portion of each of the plurality of rib members; and resistance welding the sleeve to the first end portion of each of the plurality of rib members.

Embodiment 2. The method of any prior embodiment, further comprising: arranging a second end portion of each of the plurality of rib members in a rib alignment jig.

Embodiment 3. The method of any prior embodiment, further comprising: sliding a screen cartridge over the plurality of rib members.

Embodiment 4. The method of any prior embodiment, wherein sliding the screen cartridge over the plurality of rib members includes sliding a screen cartridge formed from multiple diffusion bonded screen layers over the plurality of rib members.

Embodiment 5. The method of any prior embodiment, further comprising: positioning another sleeve about the second end portion of each of the plurality of rib members.

Embodiment 6. The method of any prior embodiment, wherein positioning the another sleeve about the second end portion includes arranging the another sleeve radially inwardly of the screen cartridge.

Embodiment 7. The method of any prior embodiment, further comprising: resistance welding the another sleeve to the second end portion of each of the plurality of rib members.

Embodiment 8. The method of any prior embodiment, further comprising: removing the rib alignment jig from the first end portion of the plurality of rib members.

Embodiment 9. The method of any prior embodiment, further comprising: resistance welding the screen cartridge to the first sleeve, each of the multiple diffusion bonded screen layers being decoupled from the plurality of ribs.

Embodiment 10. The method of any prior embodiment, further comprising: resistance welding the screen cartridge to the another sleeve.

Embodiment 11. A screen assembly comprising: a first sleeve including an inner surface and an outer surface; a second sleeve including an inner surface and an outer surface; a plurality of ribs extending between the first and second sleeves, each of the plurality of ribs being joined to one of the inner and outer surfaces of the first sleeve and one of the inner and outer surfaces of the second sleeve; and a screen cartridge extending between and coupled to the first and second sleeves, the screen cartridge being decoupled from the plurality of ribs.

Embodiment 12. The screen assembly according to any prior embodiment, wherein each of the plurality of ribs includes a first end coupled to the inner surface of the first sleeve and a second end coupled to the inner surface of the second sleeve.

Embodiment 13. The screen assembly according to any prior embodiment, wherein the first end of each of the plurality of ribs is chemically bonded to the inner surface of the first sleeve and the second end of each of the plurality of ribs is chemically bonded to the inner surface of the second sleeve.

Embodiment 14. The screen assembly according to any prior embodiment, wherein the screen cartridge includes a first end coupled to outer surface of the first sleeve and a second end coupled to the outer surface of the second sleeve.

Embodiment 15. The screen assembly according to any prior embodiment, wherein the first end is chemically bonded to the outer surface of the first sleeve and the second end is chemically bonded to the outer surface of the second sleeve.

Embodiment 16. The screen assembly according to any prior embodiment, wherein the first sleeve includes a body having at least one recess section receptive of the screen cartridge.

Embodiment 17. The screen assembly according to any prior embodiment, wherein the at least one recessed section includes a first recessed section and a second recessed section.

Embodiment 18. The screen assembly according to any prior embodiment, wherein the second recessed section is separated from the first recessed section by a raised portion.

Embodiment 19. The screen assembly according to any prior embodiment wherein the first recessed section is arranged on a first side of the body and the second recessed section is arranged on a second, opposing side of the body.

Embodiment 20. The screen assembly according to any prior embodiment, further comprising: a downhole string fluidically coupled to a surface system.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A screen assembly comprising:
a first sleeve including a radially inwardly facing surface and a radially outwardly facing surface;
a second sleeve including a radially inwardly facing surface and and a radially outwardly facing surface;
a plurality of ribs extending between the first and second sleeves, each of the plurality of ribs being joined to one of the radially inwardly facing and radially outwardly facing surfaces of the first sleeve and one of the radially inwardly facing and radially outwardly facing surfaces of the second sleeve; and
a screen cartridge extending between and coupled to the first and second sleeves, the screen cartridge being formed from multiple diffusion bonded layers and including a substantially continuous outer surface and a substantially continuous inner surface that abuts and is decoupled from the plurality of ribs, wherein the screen cartridge includes a first screen layer defined by a first perforated tube that abuts the plurality of ribs and a second screen layer defined by a second perforated tube that extends about and is bonded to the first screen layer, the first perforated tube including a first plurality of openings having a first dimension and the second perforated tube including a second plurality of openings having a second dimension that is greater than the first dimension.

2. The screen assembly according to claim 1, wherein each of the plurality of ribs includes a first end coupled to the radially inwardly facing surface of the first sleeve and a second end coupled to the radially inwardly facing surface of the second sleeve.

3. The screen assembly according to claim 2, wherein the first end of each of the plurality of ribs is chemically bonded to the radially inwardly facing surface of the first sleeve and the second end of each of the plurality of ribs is chemically bonded to the radially inwardly facing surface of the second sleeve.

4. The screen assembly according to claim 2, wherein the screen cartridge includes a first end coupled to radially outwardly facing surface of the first sleeve and a second end coupled to the radially outwardly facing surface of the second sleeve.

5. The screen assembly according to claim 4, wherein the first end is chemically bonded to the radially outwardly facing surface of the first sleeve and the second end is chemically bonded to the radially outwardly facing surface of the second sleeve.

6. The screen assembly according to claim 1, wherein the first sleeve includes a body having at least one recess section receptive of the screen cartridge.

7. The screen assembly according to claim 6, wherein the at least one recessed section includes a first recessed section and a second recessed section.

8. The screen assembly according to claim 7, wherein the second recessed section is separated from the first recessed section by a raised portion.

9. The screen assembly according to claim 7 wherein the first recessed section is arranged on a first side of the body and the second recessed section is arranged on a second, opposing side of the body.

10. The screen assembly according to claim 1, further comprising: a downhole string fluidically coupled to a surface system.

* * * * *